Figure 1A:
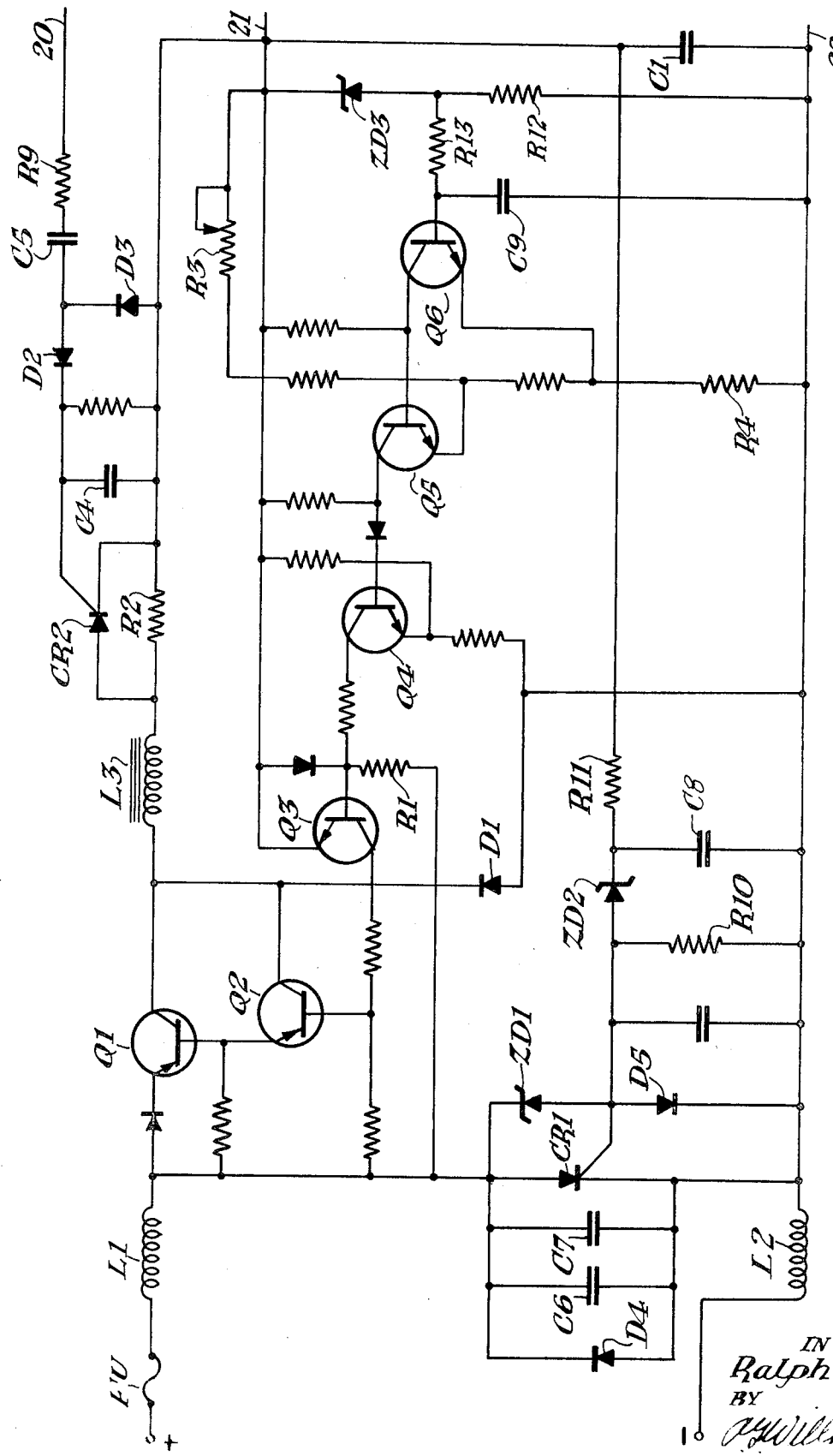

United States Patent
Popp

[15] 3,678,368

[45] July 18, 1972

[54] OVERVOLTAGE PROTECTION ARRANGEMENT FOR POWER CONVERTERS

[72] Inventor: Ralph Popp, Pittsburgh, Pa.

[73] Assignee: Westinghouse Air Brake Company, Swissvale, Pa.

[22] Filed: March 15, 1971

[21] Appl. No.: 124,365

[52] U.S. Cl. ............................................. 321/11, 321/14
[51] Int. Cl. ....................................................... H02m 1/18
[58] Field of Search .................................. 317/16; 321/11, 14

[56] References Cited

UNITED STATES PATENTS

| | | | |
|---|---|---|---|
| 3,371,262 | 2/1968 | Bird et al. | 321/14 X |
| 3,512,044 | 5/1970 | Jones | 317/16 |
| 3,436,639 | 4/1969 | Burkett et al. | 317/16 |
| 3,571,659 | 3/1971 | Anzai et al. | 317/16 |
| 3,359,434 | 12/1967 | Galluzzi | 317/16 X |
| 3,353,066 | 11/1967 | Souza | 317/16 X |
| 3,215,896 | 11/1965 | Shattuck et al. | 317/16 |
| 3,325,718 | 6/1967 | McNulty | 321/11 |
| 3,354,378 | 11/1967 | Jewett | 321/14 |
| 3,527,997 | 9/1970 | Nercessian | 321/14 X |

Primary Examiner—William M. Shoop, Jr.
Attorney—H. A. Williamson, A. G. Williamson, Jr. and J. B. Sotak

[57] ABSTRACT

A controlled rectifier is connected in multiple across a non-regulated d.c. source which supplies operating energy to a transistorized d.c. to d.c. converter apparatus. Also connected across the source, oppositely poled, is a Zener diode with a reverse breakdown voltage greater than the normal source voltage but less than the breakdown potential which damages the transistors in the voltage regulator portion of the converter. A gating signal is applied to the controlled rectifier if Zener diode breakdown occurs due to a sustained increase in source voltage. A fuse interrupts the leads from the source when the resulting high current flows through the controlled rectifier and protects the transistors from damage. Another Zener diode is connected, with reverse polarity, across the connections between the regulator and inverter portions of the converter. Its reverse breakdown voltage is selected just above the normal regulated output voltage, but low enough to protect the transistors in the inverter circuits. This second Zener diode also supplies a gating signal to the controlled rectifier, if breakdown occurs, to protect against an overvoltage due to a fault in the regulator circuits. Additional Zener diodes may be used in similar manner to protect against overvoltage faults at other points in the converter apparatus.

1 Claim, 2 Drawing Figures

INVENTOR
Ralph Popp.
BY

OVERVOLTAGE PROTECTION ARRANGEMENT FOR POWER CONVERTERS

This invention pertains to an overvoltage protection arrangement for power converters. More specifically, my invention relates to a protection circuit arrangement which checks overvoltage conditions at the source and at one or more other points in the circuitry for a transistorized power converter arrangement and interrupts the operation of such apparatus before damage occurs or an unsafe condition results in the event of fault conditions within the source or the unit itself.

It is known that transistors used within various types of circuitry must be protected from applied voltages which are greater than the breakdown voltage potential between the various electrodes of the transistors. This protection must include both transient voltage surges and continuing overvoltage conditions, the latter frequently resulting from failure in the power source regulation. Several methods have been used in the past to protect transistorized apparatus. The arrangements used for transient voltage protection are generally acceptable and adequate to meet the requirements of the protection necessary. However, a particular problem has been found to exist in power inverter and converter circuit arrangements of the transistorized type, especially where the basic power source consists of a generator and battery combination. Such power sources exist, for example, on railroad locomotives or rapid transit trains in which power conversion apparatus is required for signaling purposes. In such power converter arrangements, protection is required against overvoltage from the basic source and also against overvoltage at various points within the circuitry where the voltage level is normally regulated and is of a critical value. An overvoltage condition at these latter points results from apparatus failure, for example, failure of various elements, especially transistors, in the initial part of the converter circuitry. It is advantageous, of course, if protection can be provided against all overvoltage conditions using the same circuit arrangement and protection elements. Normally such protection can be in the form of a single shot arrangement, that is, the detection of the overvoltage condition shuts off the converter or inverter apparatus until the fault condition can be investigated and corrected.

Accordingly, an object of my invention is an improved overvoltage protection arrangement for power converter apparatus.

Another object of my invention is an overvoltage protection arrangement for power converters which detects overvoltage conditions at more than one point within the converter circuitry and interrupts the operation to protect against damage due to fault conditions.

Still another object of my invention is an overvoltage protection circuit for power converters in which voltage detector devices having different preset detection potentials are used to measure voltage levels, each at a separate point within the converter apparatus, each separately triggering a gating device under overvoltage conditions to bypass and/or interrupt the source operating voltage when an overvoltage condition is detected.

A further object of the invention is overvoltage protection circuits for power inverter or converter apparatus using Zener diodes with different breakdown potentials to detect voltages exceeding preselected levels at various points within the circuitry and to trigger a controller rectifier to shut off the power supply to the unit to halt unsafe operation when overvoltage conditions are detected.

It is also an object of my invention to supply, in a power converter circuit arrangement, a first Zener diode to detect an overvoltage condition of the basic power source and at least one other Zener diode having a different preset voltage potential to detect the voltage level at a point where a critical regulated voltage potential should appear, each Zener diode separately triggering a controlled rectifier device which when activated causes the basic power source for the apparatus to be interrupted to shut down the operation until the fault condition can be corrected.

Other objects, features, and advantages of my invention will become apparent from the following specification and appended claims when taken with the accompanying drawings.

In practicing my invention, I continue to use an inductor-capacitor circuit arrangement at the direct current source terminals to bypass transient surges of normal polarity to protect the transistors within the apparatus from these brief high voltage peaks. A diode poled opposite to the polarity of the direct current source is also connected across the input to protect against reverse polarity voltage surges from any cause. These arrangements are conventional circuitry used in the prior art. The connections from the direct current source also include a circuit interrupter, e.g., a circuit breaker or a fusible element such as a conventional fuse device, which interrupts the direct current supply under any prolonged high current condition. Although this obviously interrupts the operation of the converter apparatus, the internal elements, such as transistors, are protected from damage. My invention specifically adds to the protection arrangement a controlled rectifier connected in multiple with the capacitor portion of the transient protection. This semiconductor device is connected with its low resistance direction poled to pass current from the direct current source when the controlled rectifier device is activated. A first Zener diode is then connected across the d.c. source poled to oppose current flow from that source unless the reverse breakdown potential of this Zener diode is exceeded. The reverse breakdown potential is preselected within the range above the nominal source potential and below the breakdown potential of the transistors in the regulator section of the converter. A connection from this first Zener diode to the control or gate electrode of the controlled rectifier element applies an activating or gating signal to that element if Zener breakdown occurs. Thus, if the d.c. source potential increases over a sustained period, the Zener diode applies a gating or activating signal to the controlled rectifier which then conducts current at a relatively high level so that the fuse operates to interrupt the d.c. supply and stop operation of the converter apparatus. Converter operation remains interrupted until a maintenance check can be made to correct the fault in the source potential. This controlled rectifier and Zener diode are so connected to the leads from the source that the transient protection also prevents any triggering of the controlled rectifier by a transient voltage surge.

In the specific showing herein, a second Zener diode is connected across the output of the voltage regulator portion of the converter apparatus. The reverse breakdown potential of this second diode is selected above the normal regulator output but at a lower potential than that which will damage the transistors used in the inverter output portion of the converter apparatus. This second Zener diode is also connected to apply a gating signal to the controlled rectifier if a breakdown condition occurs due to high voltage output from the regulator portion. Again, conduction of current by the controlled rectifier causes the fuse to open and interrupt the operation of the converter apparatus to prevent an excess voltage output and/or damage to the inverter portion of the converter. Other overvoltage conditions may also be detected by adding additional Zener diodes, each referenced to the same common source connection, to detect voltage at selected points in the circuit.

Figure 1B:
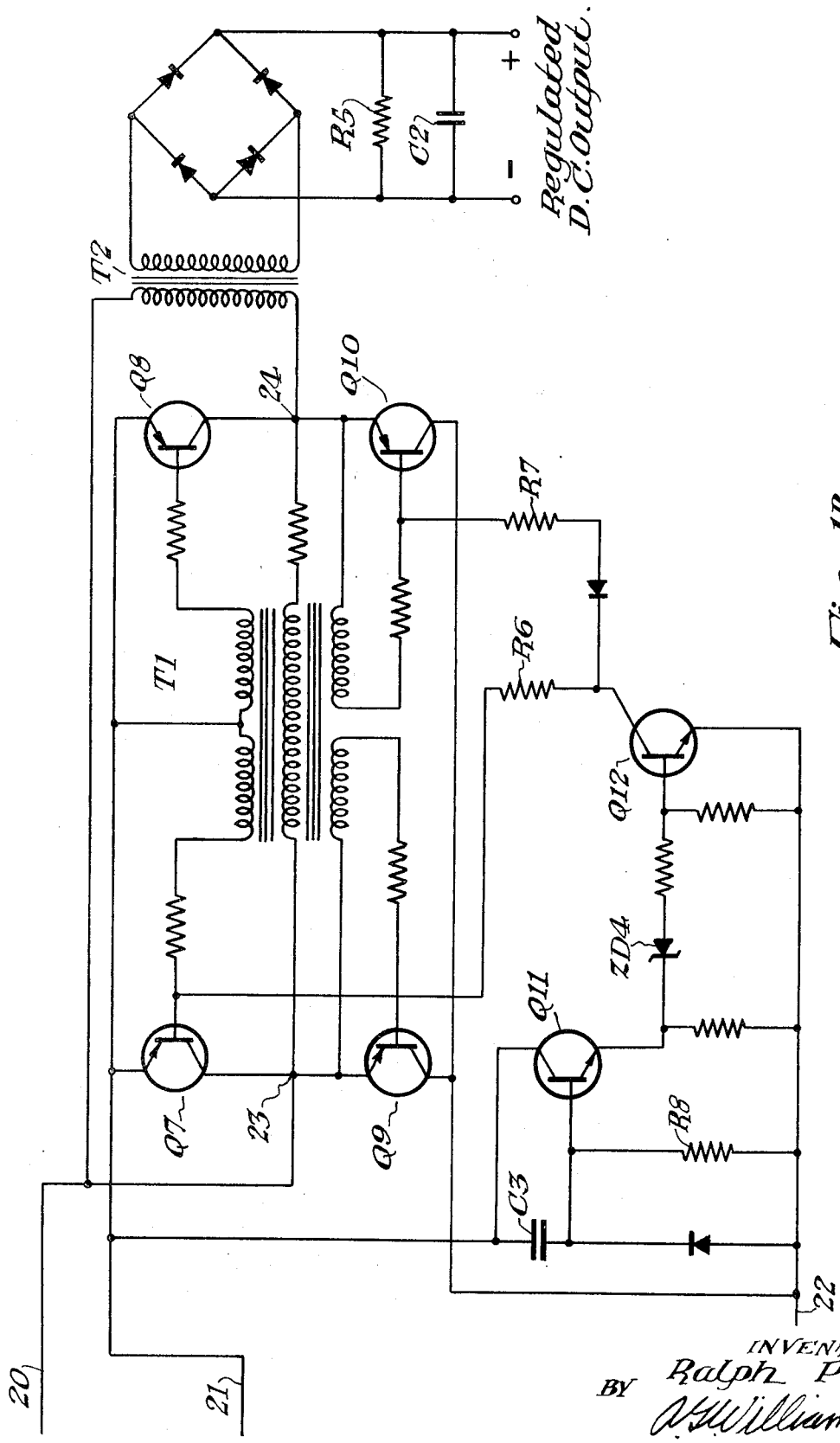

I shall now describe in greater detail an arrangement embodying the features of my invention and shall then point out the novelty thereof in the appended claims, referring during the detailed description to the accompanying drawings in which:

FIGS. 1A and 1B, when placed side by side with FIG. 1A to the left and the commonly referenced connections matching, illustrate in circuit diagram form a d.c. to d.c. converter apparatus embodying the overvoltage protection circuit arrangement of my invention.

Referring now to the drawings, the d.c. to d.c. converter apparatus used to illustrate the arrangement of my invention comprises a voltage regulator portion, shown in FIG. 1A, and an inverter portion with a rectified output, shown in FIG. 1B.

The overvoltage protection arrangement including transient or surge protection is illustrated in the lower left of FIG. 1A. This will be described in detail after the general description of the basic converter apparatus is completed. It is to be understood, of course, that the specific d.c. to d.c. converter shown is by way of example only and the overvoltage protection arrangement may be used with equivalent apparatus having different specific circuitry.

The source of direct current energy for conversion into the regulated direct current output of the converter is represented conventionally at the left of FIG. 1A by the two terminals designed by the symbols + and —. This is a nonregulated source, for example, a generator with a bank of batteries floating across the generator output, in order to establish a nominal potential level for the source and provide a standby energy source. However, as is known, if the generator voltage rises due to loss of regulation or control, the batteries will eventually accumulate an additional charge and raise the source potential to a higher voltage level. This is a particular concern where the batteries are of the NI type, as is usual on railroad locomotives or rapid transit trains. A circuit interrupter element is included in the connections to these source terminals. This element is shown as a fuse FU connected in series with the lead from the + terminal. When this fuse element opens due to high current flow, it interrupts the source connection, such action occurring if the sustained current is greater than the rated capacity of the fuse. Obviously, the predetermined fuse capacity or current rating is greater than the normal operating requirement of the converter apparatus. Also connected in series in each lead from the source is an inductor winding shown as windings L1 and L2, respectively. These serve in connection with the transient voltage surge protection which will be discussed later.

The voltage regulator circuit portion shown in FIG. 1A includes the switching transistors Q1 and Q2 and a modified Schmitt trigger arrangement comprised of transistors Q3, Q4, Q5, and Q6. Other important elements are the inductor L3 and the output capacitor C1, which cooperate to hold energy to maintain the regulated output voltage level during the regulating operations. When the converter apparatus is initially energized, transistor Q3 turns on, that is, conducts current, because of the bias established through resistor R1. Transistors Q1 and Q2 also turn on, the proper bias potentials being established by the conduction of current through the collector-emitter path of transistor Q3. Current then flows in a circuit through the emitter-collector path of transistor Q1, inductor L3, and resistor R2 to charge capacitor C1. Resistor R2 is used to limit the peak starting current to protect transistor Q1. This resistor R2 is later shunted by a controlled rectifier CR2 whose operation will be described shortly. The circuit by which capacitor C1 is charged also includes fuse FU and inductors L1 and L2 previously discussed. It is to be noted at this point that the controlled rectifier CR1, connected across the input leads, is normally in its nonconducting condition since a gating signal is not applied to its control electrode except under overvoltage conditions, as will be described later.

The Schmitt trigger arrangement is designed to sense the voltage level on capacitor C1 and to turn transistor Q1 on and off, preferably within a voltage regulation having no more than ½ volt differential. A reference voltage for the regulation is established at the anode of Zener diode ZD3, this reference voltage varying in accordance with the potential drop across resistor R12 as the current flowing through the series circuit consisting of diode ZD3 and resistor R12 changes with the variable voltage on capacitor C1. A variable resistor R3 is used to adjust the output level and to compensate for voltage variations due to the necessary tolerances in the parameters of resistor R12 and diode ZD3. A filter arrangement consisting of resistor R13 and capacitor C9 bypasses any alternating current transient voltages appearing across capacitor C1 so that they do not effect the proper operation of transistor Q6. It may be noted that temperature compensation also may be included within the overall resistor R4 shown in the emitter circuit of transistor Q6.

When the potential on capacitor C1 is greater than the selected regulated voltage, transistor Q6 turns on, i.e., becomes conducting, due to the increase in positive bias applied from the anode of diode ZD3. This results, within the Schmitt trigger arrangement, in transistor Q5 being turned off, transistor Q4 being turned on, and transistor Q3 being turned off. With transistor Q3 in its nonconducting condition, transistors Q1 and Q2 likewise become nonconducting. The energy stored in inductor L3 then flows into capacitor C1 with diode D1 providing a return path. This current flow continues until the energy stored in inductor L3 dissipates. As the potential on capacitor C1 decreases the ½-volt differential at which the regulation is established, transistor Q6 turns off. Through the chain action, transistor Q3 again becomes conducting and likewise transistor Q1 again conducts current and switches on the regulation apparatus. This cycling action repeats or continues with transistor Q1 being periodically turned off and then again turned on, following the action of transistor Q3.

Referring now to FIG. 1B, the inverter circuitry shown therein includes a magnetic oscillator comprising transformer T1 and transistors Q7, Q8, Q9, and Q10. Such inverter apparatus is known in the prior art and only a brief description of its operation will be given. Operating energy is supplied over connecting lines 21 and 22 from the regulated voltage across capacitor C1 in FIG. 1A. The oscillator element provides an alternating current output at points 23 and 24. This results from the alternate conduction by the pairs of transistors Q7, Q10 and Q8, Q9. As a result of this alternating polarity supply at points 23 and 24, an alternating current flows through the primary winding of output transformer T2. The output from the secondary winding of transformer T2 is applied to a full wave bridge type rectifier shown by a conventional symbol. The output of the rectifier is then a regulated direct current voltage, for example, at the level of 32 volts. This output is filtered by the combination of resistor R5 and capacitor C2 in a conventional manner.

In order that the converter apparatus shown in the drawings may be able to start under rather heavy load conditions, such as several electric lamps in multiple, a starting circuit is provided so that the continued heavy base power requirements may be removed as soon as possible to avoid overheating the transistors involved in the oscillator arrangement. The starting circuit comprises transistors Q11 and Q12 with the associated circuitry. When the converter apparatus is energized, transistor Q11 turns on since capacitor C3 is initially discharged and the voltages on the collector and base of transistor Q11 are both positive. With positive potential on the emitter of transistor Q11, Zener diode ZD4 conducts current in its reverse direction. This Zener diode has a reverse breakdown voltage preselected at approximately the mid-point of the regulated output voltage or, for specific example, at approximately 14 volts. When Zener diode ZD4 breaks down, a positive potential is applied to the base of transistor Q12 and this transistor also becomes conducting. Through resistors R6 and R7, a negative bias is then applied to the base electrodes of transistors Q7 and Q10, respectively, to cause these two transistors to become conducting to initiate the operation of the magnetic oscillator circuit arrangement. As capacitor C3 charges, the emitter potential of transistor Q11 is reduced. Eventually diode ZD4 becomes non-conducting and transistor Q12 is turned off. This disconnects the bases of transistors Q7 and Q10 from the connection to the negative potential of the basic d.c. source, that is, from a connection through resistors R6 and R7 to lead 22. The operation of the oscillator arrangement is by this time self-sustaining so that the external bias potentials to the bases of transistors Q7 and Q10 are no longer needed. The charging time of capacitor C3 through resistor R8 is made sufficiently long to permit this assured starting of the oscillator. It may be noted that, if the direct current output from the converter is short circuited, the oscillator will stall but no damage will occur. However, to restart, the direct current supply must be briefly opened so that capacitor C3 becomes discharged and the starting circuit can function as it does initially, as previously described.

An additional starting arrangement is provided for the complete converter apparatus herein shown. Many such circuits have a switch or push button arrangement to start the inverter to thus manually provide voltage for the control circuit during the starting period. However, the necessity for such manual control is here avoided by the circuit arrangement including previously mentioned resistor R2, controlled rectifier CR2, and the circuitry connected to the control electrode of this controlled rectifier. In operation, at the instant energy is provided to the converter arrangement and with capacitor C1 discharged, the peak current through transistor Q1 s limited by resistor R2, as previously defined. This resistor may be a form of fusible element which would open the circuit to protect the apparatus if the inverter or oscillator arrangement fails to start or the controlled rectifier does not function properly. The control electrode of rectifier CR2 receives signal energy from a current limited, voltage doubler circuit comprising capacitor C4 and diodes D2 and D3. The necessary alternating current is supplied over connection 20 from point 23, generated by the alternate switching action of transistors Q7 and Q9. The gating current and voltage across capacitor C4 are controlled by capacitor C5 and resistor R9. The constant gate current thus supplied prevents controlled rectifier CR2 from turning off, after the inverter is operating, due to current transients in the regulator loop arrangement which might cause the current to momentarily fall below the holding current value of the controlled rectifier. With rectifier CR2 held conducting, resistor R2 is bypassed and removed from the switching circuit through the emitter-collector electrode path of transistor Q1.

The overvoltage and transient surge protection is provided by the circuit arrangement in FIG. 1A which includes controlled rectifier CR1, Zener diodes ZD1 and ZD2, inductors L1 and L2, capacitors C6 and C7, and diode D4. Voltage surge protection is specifically provided by inductors L1 and L2 and capacitors C6 and C7. These two capacitors have different values in order to match the characteristics of different steep wave fronts of the transient surges. The series circuit across the voltage source through inductors L1 and L2 and capacitor C6 and C7 bypasses the steep wave front of the line-to-line voltage surges. This protection arrangement is adequate to handle voltage surges on the order of 10 to 15 times the nominal voltage of the direct current source. Diode D4 protects against reverse polarity voltage applications or surges bypassing such voltages away from the converter apparatus. Diode D4 also protects against inductive transients in the input when the direct current source is disconnected.

However, this transient voltage protection arrangement does not serve to protect against long term overvoltage conditions which are possible with a non-regulated d.c. supply source. As previously indicated, one intended use for converter units of this type is on railroad locomotives or rapid transit trains where the direct current source is a generator with a battery floating across the generator output to provide a reservoir for voltage maintenance. However, a loss of regulation in the generator drives the battery voltage higher, the voltage increasing gradually as the charge on the battery builds up. To protect against such overvoltage conditions of long term duration, my invention adds controlled rectifier CR1 and Zener diode ZD1. Rectifier CR1 is connected across the voltage source, including only in the series circuit fuse FU and both inductors L1 and L2. This controlled rectifier is normally in its nonconducting condition so that, although the low resistance direction of the rectifier is properly poled, no current normally flows in this relative short circuit. Zener diode ZD1 is connected across the anode and control or gate electrode of rectifier CR1, poled with its high resistance direction opposite to the normal unidirection flow path through rectifier CR1. Said in another way, Zener diode ZD1, in a series connection with the multiple path through diode D5 and resistor R10, is connected across the d.c. source at the same points as is rectifier CR1, with a gating connection between the anode of diode ZD1 and the control electrode of rectifier CR1. Diode D5 serves to establish a gating voltage which is sufficient to trigger rectifier CR1 into conduction, when diode ZD1 conducts, but at the same time is limited to a voltage level which will avoid damage to the controlled rectifier. Although shown as a single unit, diode D5 represents also the use of two or more diode units in series as may be necessary to properly fix the gating voltage level. Rectifier CR1 and diode ZD1 are connected to the source leads to include inductors L1 and L2 in their circuit path to avoid any inadvertent breakdown of diode ZD1 when transient voltage surges occur.

The reverse breakdown potential of diode ZD1 is preselected to be greater than the nominal voltage of the direct current source but less than the breakdown voltage between emitter and collector electrodes of transistors Q1 and Q2. For example, in one type of installation where the nominal voltage of the direct current source is between 60 and 80 volts and the transistors have a breakdown voltage of approximately 120 volts, Zener diode ZD1 is selected to have a reverse breakdown voltage potential of approximately 100 volts, $\pm 5$ percent. If a fault in the direct current source causes the input voltage to the converter apparatus to gradually rise toward a dangerous level, the breakdown voltage of Zener diode ZD1 is eventually exceeded and this unit passes current in the normal high resistance direction. The voltage appearing at the anode of diode ZD1, created by the potential drop across diode D5, is applied to the gate or control electrode of controlled rectifier CR1, triggering this unit so that it begins to pass current between the two terminals of the voltage source. While this current is somewhat limited by inductors L1 and L2, it will still be of sufficient value to exceed the rating of fuse FU which thus operates to interrupt the input voltage and discontinue operation of the converter. This interruption occurs before the breakdown voltage of transistors Q1 and Q2 is reached and thus protects these and the remaining apparatus from overvoltage damage. Once the overvoltage condition of the source is corrected, the replacement of the fuse will restore operation of the power converter apparatus. Rectifier CR1, of course, resets to its nonconducting condition when the current flowing drops below the holding current level of this device.

A similar type protection is provided for the inverter section of the apparatus shown in FIG. 1B if a fault occurs in the regulator portion, for example, transistor Q1 shorts between its emitter and collector electrodes. Under these conditions, the nominal voltage of the direct current source would be applied directly to the transistors of the inverter section which usually have a lower breakdown rating than do the switching transistors Q1 and Q2. In order to provide this protection Zener diode ZD2 is connected in a series circuit with resistors R11 and R10 across the storage or regulator capacitor C1. In other words, diode ZD2 is connected from the positive side of capacitor C1 to the apparatus common connection 22 and thence through inductor L2 to the negative terminal of the direct current source. The circuit arrangement of resistor R11 and capacitor C8 provides a decoupling filter which prevents any voltage surge developing during the starting of converter operation from triggering the breakdown of Zener diode ZD2.

The breakdown potential of Zener diode ZD2 is selected to be slightly greater than the designed output voltage of the regulator section. For example, in the case where the regulator output is approximately 35 volts, the breakdown potential of diode ZD2 is selected between 40 and 45 volts. If the voltage potential buildup on capacitor C1 exceeds this breakdown voltage of diode ZD2, current flows through this diode and a signal is applied from its anode electrode to the gate or control electrode of rectifier CR1. Again diode D5 establishes and also limits the voltage level of this gating signal. This triggers controlled rectifier CR1 to pass current and the flow of current between the terminals of the direct current source through this activated rectifier again exceeds the rating of fuse FU which operates to interrupt the direct current input. This, of course, also removes the high level output of capacitor C1 which resulted from the fault condition in the regulator portion and thus protects the transistors and other apparatus of the inverter section from the high voltage condition. This action also prevents an overvoltage output from the converter. It will be obvious that any other points in the entire circuit that uses the same common return 22 to the negative side of the direct current source can be protected, against a sustained high voltage, using controlled rectifier CR1 through the triggering arrangement of an additional Zener diode and decoupling filter connected between each point at which the high voltage is to be detected and the negative terminal of the source. Once a fault condition is corrected by maintenance, reclosing the circuit interrupter, e.g., replacement of the fuse, will restore the operation of the power converter apparatus.

The arrangement of my invention thus provides for protection against a continued or sustained overvoltage condition which may exceed the breakdown limits of the transistor elements used in a specific power converter apparatus. Not only is an overvoltage condition of the basic direct current power source detected and protected against but, with the addition of only a Zener diode detector, overvoltage conditions at other points in the circuit arrangement can be detected and similar protection provided. This protection is achieved with an efficient and effective circuit arrangement using only a small amount of additional apparatus. Specifically, only a single controlled rectifier device is required which may be controlled by one or more Zener diode detectors to provide the simplified, yet assured, protection of the remaining portion of the apparatus.

Although I have herein shown and described but a single form of power converter apparatus embodying the overvoltage protection arrangement of my invention, it is to be understood that various changes and modifications within the scope of the appended claims may be made without departing from the spirit and scope of my invention.

Having thus described my invention, what I claim is:

1. Power converter apparatus comprising in combination,
   a. a nonregulated source of direct current energy having a normal voltage level and including a fusible element,
   b. a transistorized regulator circuit means connected across said source and operable to produce and maintain an output at a first preselected voltage level,
   c. a transistorized inverter circuit means connected to the output of said regulator circuit means and operable when energized to provide an alternating current voltage output,
   d. a rectifier means connected to the output of said inverter circuit means and operable to transform said alternating current output into a direct current output at a final preselected voltage level,
   e. a normally nonconducting controlled rectifier device having a control electrode and connected across said source poled to pass current from said source when an activating signal is applied to said control electrode, said current being sufficient to open said fusible element,
   f. a first Zener diode having a reverse breakdown voltage selected in the range between said normal voltage level and the breakdown potential of the transistors in said regulator circuit means,
      1. said first Zener diode connected in multiple with said controlled rectifier device and poled to normally block flow of current from said source,
   g. the control electrode of said rectifier device connected to receive an activating signal through said first Zener diode, when its reverse breakdown voltage is exceeded by the voltage level of said source, to protect the transistors of said regulator circuit means from a continued overvoltage condition,
   h. a second Zener diode having a reverse breakdown voltage selected above said first preselected voltage level but below the breakdown potential of the transistors in said inverter circuit means,
      1. said second Zener diode connected across the output of said regulator circuit means and poled to normally block any flow of current therethrough,
   i. the control electrode of said controlled rectifier device also connected to receive an activating signal through said second Zener diode, if the output of said regulator circuit means exceeds said first preselected voltage level, to protect the transistors of said inverter circuit means from the application of excessive operating voltage and to prevent an overvoltage output from said rectifier means,
   j. an inductor connected in each lead from said direct current source to be in series with the multiple paths through said controlled rectifier and said regulator circuit means, and
   k. a capacitor means connected in multiple with said controlled rectifier,
   l. the inductor-capacitor circuit path having transmission characteristics for providing a bypass for transient voltage surges having a potential level sufficient to damage the transistors of said apparatus.

* * * * *